(12) United States Patent
James

(10) Patent No.: US 7,677,204 B1
(45) Date of Patent: Mar. 16, 2010

(54) DOG TRAINING DEVICE

(76) Inventor: Chad James, 5418 N. Ridge Spring Pl., Tucson, AZ (US) 85749

(*) Notice: Subject to any disclaimer, the term of this patent is extended or adjusted under 35 U.S.C. 154(b) by 0 days.

(21) Appl. No.: 11/603,346

(22) Filed: Nov. 21, 2006

Related U.S. Application Data

(63) Continuation of application No. 10/877,871, filed on Jun. 25, 2004, now abandoned, which is a continuation of application No. 10/188,156, filed on Jul. 1, 2002, now abandoned.

(51) Int. Cl.
*A01K 15/00* (2006.01)
(52) U.S. Cl. .................. 119/712; 119/822; 119/859
(58) Field of Classification Search ........... 119/712, 119/720, 765, 822, 859, 905, 908; 231/7
See application file for complete search history.

(56) References Cited

U.S. PATENT DOCUMENTS

| | | | | |
|---|---|---|---|---|
| 2,842,099 A | * | 7/1958 | Miller | 119/822 |
| 2,940,425 A | * | 6/1960 | Dykens | 119/822 |
| 4,128,200 A | * | 12/1978 | Jones et al. | 231/7 |
| 4,153,009 A | * | 5/1979 | Boyle | 119/850 |
| 4,763,660 A | * | 8/1988 | Kroll et al. | 600/391 |
| 4,969,418 A | * | 11/1990 | Jones | 119/712 |
| 5,158,039 A | * | 10/1992 | Clark | 119/712 |
| 5,203,542 A | * | 4/1993 | Coley et al. | 256/10 |
| 5,207,178 A | * | 5/1993 | McDade et al. | 119/859 |
| 5,894,818 A | * | 4/1999 | Betzen | 119/712 |
| 5,896,830 A | * | 4/1999 | Stampe | 119/822 |
| 5,934,225 A | * | 8/1999 | Williams | 119/859 |
| 6,567,699 B2 | * | 5/2003 | Alferness et al. | 607/5 |
| 6,769,235 B1 | * | 8/2004 | Hayes | 54/71 |
| 6,961,622 B2 | * | 11/2005 | Gilbert | 607/148 |

* cited by examiner

*Primary Examiner*—David J Parsley
(74) *Attorney, Agent, or Firm*—Lawrence R. Oremland, P.C.

(57) ABSTRACT

An animal training device utilizes electrical voltage pulses applied between spaced electrical conductors placed in close proximity to the skin of the animal to provide a stimulus useful in training the animal. The conductors, are exposed and are substantially flat; and these spaced conductors may be placed side-by-side in a localized area, around the entire inner surface of a collar or strap on an animal's neck, or spaced on the body of the animal in different locations. Alternatively, the conductors may be located on the end of a livestock prod.

6 Claims, 2 Drawing Sheets

DOG TRAINING DEVICE

RELATED APPLICATION APPLICATIONS

This application is a continuation of application Ser. No. 10/877,871, filed on Jun. 25, 2004, now abandoned which in turn is a continuation of application Ser. No. 10/188,156, filed on Jul. 1, 2002 (now abandoned).

BACKGROUND

In the training of animals, such as dogs and horses, and in the handling of livestock, various techniques are employed by trainers for encouraging or discouraging various responses or behaviors of the animal. Particularly with respect to dogs, encouragement may be effected by means of a small tidbit of food as a reward for desired behavior or responses. For undesirable behavior or responses, for animals of various types, a loud disapproving voice, or a mild physical reprimand or other physical stimulus, often is employed.

Various devices have been designed for applying a stimulus for undesirable behavior in the form of an electrical stimulus to the neck of the dog undergoing training, or in the case of livestock handling, in the form of an electrical shock delivered through what is known as a "cattle-prod". With respect to dog training, many of these devices include radio signal receiver packs for responding to transmitted signals which trigger or initiate the electrical stimulation, as desired, under the control of the trainer operating a transmitter.

With respect to such training devices, particularly as used for dogs or similar animals, it has been typical to apply the electrical stimulation directly to the animal's skin. Since animals often carry a fairly large amount of coat over the skin, prior art devices generally use two spaced metal electrodes in the form of small rounded points approximately 5/16 inches to 7/8 inches in length protruding from the stimulator housing itself, or from the collar strap worn by the animal. These two spaced points typically are between 1" to 1¾" apart and, are of opposite electrical potential and must always come into contact with the skin of the animal. Devices of these types have been used for many years; and the design of the protruding electrodes is utilized in an effort to ensure that the stimulation is consistently received by the animal on its skin.

A number of disadvantages exist with respect to the prior art animal training stimulators, particularly of the type worn on the collar strap of the animal, such as a dog. Generally, the stimulator housing contains a battery and electrical circuitry to develop a high voltage electrical charge to be applied through these two metal electrodes when a switch (either radio activated or manually activated) is closed. The weight of the housing typically is from four ounces to twelve ounces; and it generally is installed onto a collar strap, which then is placed around the neck of the animal, in most cases. The tightness of the collar strap is extremely important, in order that the end result of the performance of the device is consistent and is as desired. If the collar strap is too loose, the two electrodes break contact with the skin and the animal does not feel the electrical stimulation consistently. This causes the animal to become confused and not appropriately responsive; or the user is led to believe that the device is faulty and then returns to the seller or discards it.

If the collar strap on the neck of the animal is too tight, the animals's skin also can become irritated due to the rubbing action of the two long pointed protruding metal electrodes which extend through the coat and contact the skin. If this irritation is not visually observed by the trainer or the user, the irritation may cause open sores which require veterinary assistance.

Even if the collar strap initially is adjusted properly, during normal daily routines, animals move about causing the tightness to change. This also causes inconsistent performance of the devices using two long protruding metal electrodes. The weight of the stimulator housing, which generally hangs down beneath the neck of the animal, amplifies the difficulty in attaining the proper tightness control as well.

Even though the metal electrodes are somewhat rounded on their ends where contact with the skin is made, the overall design of prior art devices still necessarily is a pointed protruding metal electrode subject to the disadvantages noted above. Over the years, various styles of metal electrodes have been attempted, by making them larger in diameter, shorter in length, plastic coated, and the like; but the underlying basic problem with protruding metal electrodes remains, even though such modifications have been attempted.

In addition, remote controlled electrical stimulation for training of animals has evolved over the years, to the point where lower and lower levels of electrical stimulation (lower voltage levels) are being used. In this manner, animal trainers are learning that less voltage, or less stimulation, is better for training purposes, keeping the animal motivated to perform the desired tasks. As the level of electrical stimulation has been decreased, however, over the years, the interface capability to the skin of the animal such as a dog, from the device, began to reduce or become unreliable. Consequently, this has caused trainers considerable difficulty during training sessions as a result of confusion in the animal undergoing training. In some cases, the stimulation perceived by the animal is at the proper level; whereas even in the same training session, or in a subsequent training session, because of insufficient contact with the skin, the stimulation level differs, even though the actual voltage level being applied to the electrodes may remain the same. Without consistency of stimulation at any desired level, proper training of the animal is rendered more difficult.

The Powell U.S. Pat. No. 4,887,549 is directed to a dog training apparatus which utilizes stimulation electrodes. The patent does not provide a clear disclosure of the nature of the electrodes; but they appear to be in the form of two button-like projections. Basically, however, these projections are of the general type described above in conjunction with the prior art in general, showing that they are spaced at least one inch apart. In Powell, however, it is stated that there is no need for the electrodes to touch the dog's skin directly; and this is done to eliminate the possibility of abrasions caused by a tight fitting collar with protruding electrodes. The solution in the system of Powell is to provide extremely high voltage, short duration pulses. By utilizing extremely high voltage pulses, albeit of short duration, a problem still exists of inconsistent application of the desired stimulus because of the wide distance between the two electrodes, which can lead to confusion of the animal undergoing training. For example, if the electrodes actually do touch the skin, the stimulus will be very severe, and much greater than what will be applied when the electrodes are separated from the skin by a loose fitting collar. Consistency of application, once again, becomes difficult with the device of this patent.

The to Walker U.S. Pat. No. 4,945,860 is directed to a stock handling device, and is illustrated as showing an electrical stimulation or shock unit attached to the head of a cow or similar animal. Soft contact pads with large surface areas are used for the electrodes. One of them is placed on the forehead of the animal; and the other is placed within a collar strap around the neck of the animal. The stimulation pulses are applied between these contact pads and obviously cause the stimulation to move through the head of the animal.

In all of the devices discussed above, the basic concept of providing a relatively high electrical voltage pulse generator, worn by the animal, is common to all of them. This pulse generator is turned on or triggered to apply an electrical voltage pulse across a pair of spaced, protruding metal electrodes, either through a direct action of the animal (such as barking, muscle movement of the type effected by digging), or under control of the trainer providing commands to the animal. The operation of all of these devices is substantially the same. All of them (with the exception of Walker) are subject to the common disadvantage which is set forth above.

It is desirable to provide a dog training device using electrical stimulation which overcomes the disadvantages of the prior art.

SUMMARY OF THE INVENTION

It is an object of this invention to provide an improved dog training device.

It is another object of this invention to provide an improved electrical dog training device.

It is an additional object of this invention to provide an improved animal training device for applying electrical stimuli to a dog.

It is a further object of this invention to provide a dog training device employing a substantially flat non-conductive housing on which many spaced conductors carrying positive and negative electrical voltage pulses are placed, wherein the housing is designed to be worn by a dog in close proximity to the skin of the dog.

DETAILED DESCRIPTION

Figure 1:
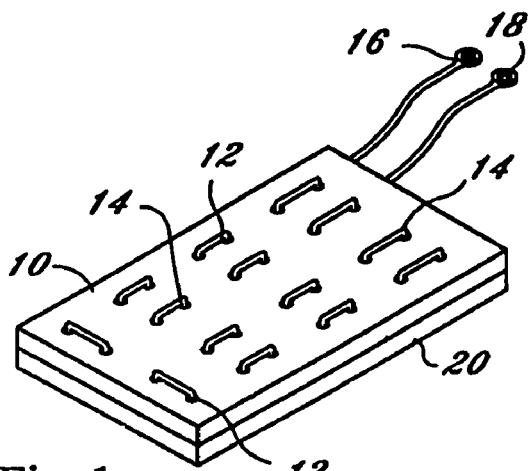
FIG. 1 is a top perspective view of an embodiment of the invention.
Figure 2:
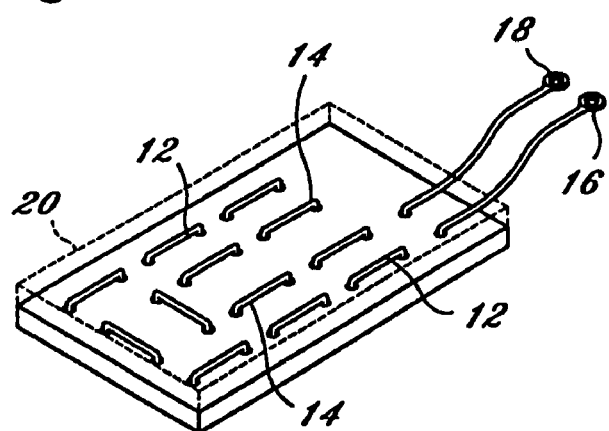
FIG. 2 is a bottom perspective view, with a portion removed, of the embodiment shown in FIG. 1.

As used herein, the term "housing" also means any surface having the general configuration of the various embodiments shown in the drawing, including the interior of a collar strap, or surface of a harness, halter or other device to be worn by a dog. It also should be noted that the various embodiments of the invention, which are shown in the different figures of the drawings, all may be supplied with electrical voltage pulses by any of a number of commercially available devices presently being used for providing electrical pulses through two spaced protruding electrodes in animal training or animal handling applications. For that reason, such power supplies (whether activated manually, or operated in response to radio signals) are not shown in the drawings, since they are well known and are not important to an understanding of the invention. Such devices typically have a pair of output terminals on them; and the various connecting leads which are shown in the different embodiments described hereinafter may be connected to those two output terminals for receiving electrical voltage pulses to operate the different embodiments of FIGS. 1 to 13 in place of the standard two protruding electrodes.

Reference now should be made to FIGS. 1 through 5, which illustrate an embodiment of applicant's invention. In the device shown in these figures, the animal training device is constructed in the form of a generally flat, non-conductive plastic housing or circuit board (which may be rigid or flexible) having a portion 10 with a number of spaced holes through it for accommodating a pair of spaced conductive leads 12 and 14, which are threaded through the holes to provide exposed spaced surfaces of each of these conductive leads or wires in the form of conductor sections as clearly shown in FIGS. 1, 4 and 5.

Figure 4:
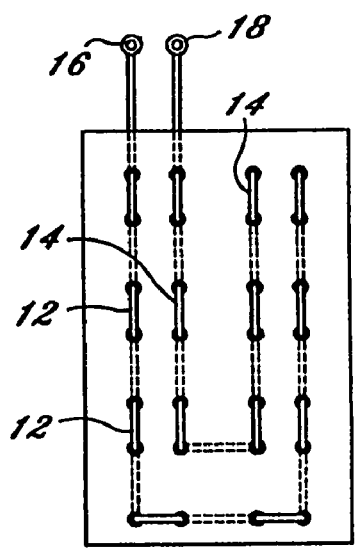
FIG. 4 is a top view of the embodiment shown in FIG. 1.
Figure 5:
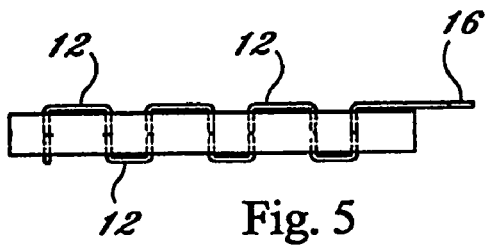
FIG. 5 is a side view of the portion of the embodiment shown in FIG. 2.

The exposed portions of the two leads or wires 12 and 14, forming the conductors, are substantially adjacent one another, as is most clearly shown in FIG. 4, and essentially comprise elongated flat sections of wire closely following the generally flat surface of the portion 10 of the housing. This is the portion, namely the surface 10, shown facing upwardly in FIG. 1, which is placed adjacent the coat of the animal in the area where the stimulation is desired. The device is shown in its partially cut-away configuration in FIG. 2 to illustrate the zig-zag threading of the conductor wires 12 and 14 through the surface 10, in the manner shown most clearly in FIG. 5.

Figure 3:
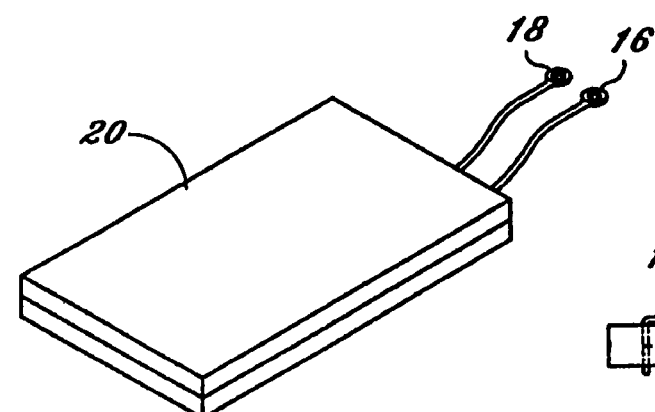
FIG. 3 is a bottom perspective view of the embodiment shown in FIG. 1.

When the device is completed by threading the conductor leads or wires 12 and 14 in the manner shown in FIGS. 1,2,4 and 5, it typically is potted or enclosed so that the non-exposed surfaces are covered by another non-conductive layer or sheet 20, as shown in FIG. 3. Typically, the parts 10 and 20 are thermoplastic and are bonded together in a conventional manner to form the housing, with the exposed segments 12 and 14 for use in conjunction with a collar, halter, or other training device. Power for applying electrical voltage pulses to the conductor leads or wires 12 and 14 is applied through corresponding opposite polarity input terminals 16 and 18. The interconnections of the terminals 16 and 18 to the conductor wires 12 and 14 is clearly shown in FIGS. 4 and 5. The distance between adjacent ones of the exposed portions of the conductor leads or wires 12 and 14 on the surface of the portion 10 of the housing is selected to be between 1/8" to 3/4". The overall size of the surface 10 is of a relatively small area, typically on the order of 1" wide to 1½ in length. As a consequence, many possible electrical paths are made between the positive potential and the negative potential exposed segments.

The overall structure which results in the device which is illustrated in FIGS. 1 through 5 (and which also is shown in the various other embodiments, to be described subsequently) is that of a device employing a relatively thin conductor pattern with many possible electrical paths between a plurality of pairs of conductor segments. This configuration replaces the traditional single pair of long, protruding, rounded metal electrodes currently used on existing products, which provide only two points of contact. In addition, the flat configuration of the housing and the many spaced apart conductors allows for a snug fit of the device over the coat or fur of the animal, without causing irritation to the skin of the animal. The surface conductors may be attached to the collar in a variety of ways; or the housing for the surface conductors may be used separately from a collar strap or halter itself. For example, the overall configuration shown in FIGS. 1 through 5 may be employed by placing both the positive and negative surface conductors 12 and 14 in a single surface housing, such as the surface housing 10/20 in a variety of locations on the animal while the terminals 16 and 18 are connected to a suitable output from an external stimulator.

Another orientation of the embodiment shown in FIGS. 1 through 5 may involve using both the positive and negative surface conductors 12 and 14 contained in a single surface housing which surrounds the entire surface of the neck of an animal, or the leg or chest, nose, tail, girth, etc. of the animal while the terminals 16 and 18 are connected to a suitable output from an electrical voltage generator of the type described previously. Alternatively, a number of housings of the type shown as the housing 10/20 in FIGS. 1 through 5 may be placed in different locations on the body of the animal, and connected to the output of an external stimulator unit (voltage source) by means of an extender hard-wired strap, or by remote controlled devices, with each of the different housings being controlled simultaneously, independently, or sequentially, as desired.

Figure 6:
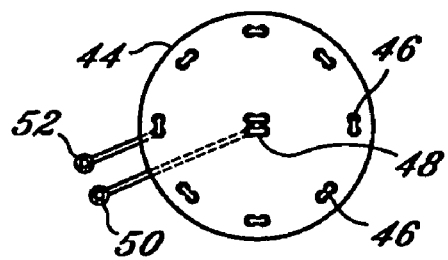
FIG. 6 is a top view of another embodiment of the invention.

FIGS. 6 through 9 illustrate another configuration employing the same basic operating principles of the embodiments shown in FIGS. 1 through 5. In the embodiment shown in FIGS. 6 through 9, the overall configuration of the housing is in the form of a flat circular non-conductive plastic plate 44; and a pair of spaced conductor wires 46 and 48 are employed and threaded in a fashion similar to that shown in FIGS. 1 through 5 to form a central conductor pair 48 at substantially the center of the circular plate or housing 44 surrounded by segments 46 of the other wire conductor generally spaced close to the circumference of the non-conductive circular housing 44. The spacing of the segments 46 from the pair 48 is between ⅛" and ¾". The circumference of the plate 44 is generally between 1" and 1½". FIG. 6 is a top view; and the connections to the center conductor are through the terminal 50 and to the outer conductor wire segments 46 through the terminal 52, much in the same manner as described above in conjunction with the previous embodiments.

Figure 7:
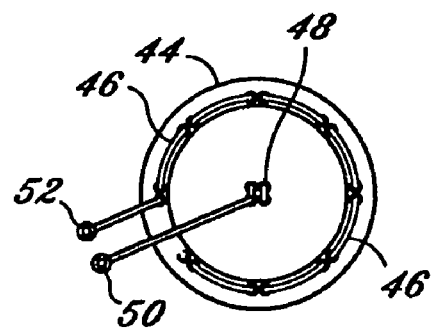
FIG. 7 is a bottom view of a portion of the embodiment shown in FIG. 6.
Figure 8:
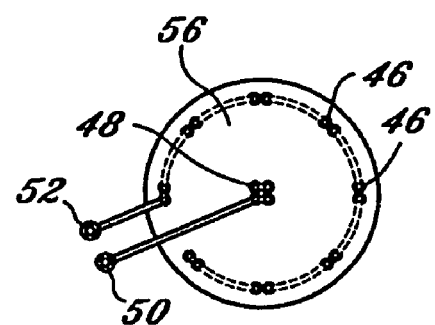
FIG. 8 is a bottom view of the embodiment shown in FIG. 6.
Figure 12:
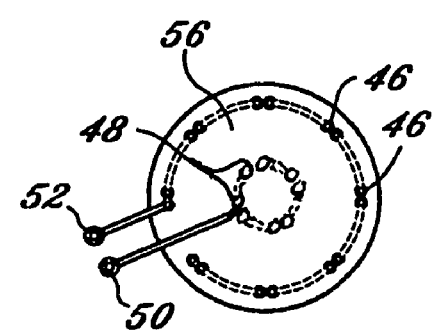
FIG. 12 is a bottom view of the embodiment shown in FIG. 10.
Figure 9:
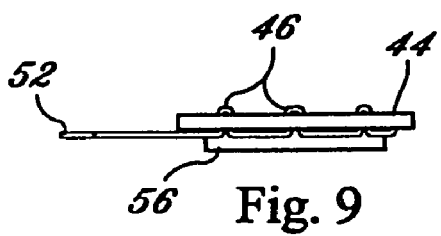
FIG. 9 is a side view of the embodiment shown in FIG. 6.

FIG. 7 is a bottom view illustrating the manner in which the conductor wires 48 and 46 extend on the bottom of the device. FIG. 8 shows the bottom of the device, where it is closed with suitable non-conductive material, such as plastic which is bonded, thermoset, or injection molded to cover the conductor wires on the bottom; so that only the conductor wire segments (or conductor pins) on the top surface of the portion 44 are exposed for placement in proximity with the skin of the animal. FIG. 9 is a side view which illustrates the relative arrangement and threading of the outer conductor wire 46 around a circular extension or bottom 56 formed as a part of, or attached to, the portion 44, to illustrate the manner in which the segments of the conductor wires 46 are formed on the surface of the portion 44.

The embodiment shown in FIGS. 6 through 9 also may be constructed by forming the outer conductor segments 46, which are exposed on the top or upper surface of the housing 44, in the form of pins with a rounded top extending just slightly beyond the upper surface of the housing 44, in the same manner as the loops of wire 46 are shown in FIG. 9. The pins, however, may then be firmly molded into the top of the housing and interconnected by a conductive wire at a portion extending below the top surface 44, again, much in the same manner as such an interconnecting wire is illustrated in FIG. 8.

Similarly, the conductor 48 may be in the form of a rounded end pin or button extending through the housing and connected to the terminal 50 in the same manner shown in FIG. 7. It should be noted, that whether this configuration is used or the one which is illustrated in FIGS. 6 through 9 is used, the projecting portions of the conductors which are on the surface of the housing 44 does not include any sharp projections, and basically are at the surface of the housing 44, or only slightly extending beyond that surface.

FIGS. 10 through 13 illustrate a different configuration employing the same basic operating principles of the embodiment shown in FIGS. 1 through 5, and in the embodiment shown in FIGS. 6 through 9. In the embodiment of FIGS. 10 to 13, the overall configuration of the housing again is in the form of a flat, circular, non-conductive plastic plate 44, with a pair of spaced conductor wires 46 and 48 employed and threaded in a fashion similar to the one shown in FIGS. 6 through 9. In the embodiment of FIGS. 10 through 13, however, the central conductor wires extend through the plate 44 in a circular pattern to form segments 48 in an inner circle surrounded by the outer circle of segments 46 of the other wire conductor. The segments 46 are generally spaced close to the circumference of the non-conductive circular housing 44. The spacing of the segments 46 from the inner segments 48 is between ⅛" and ¾" between the various segments 46 and 48 which are nearest one another. The circumference of the plate 44 generally is between 1" and 1½".

Figure 10:
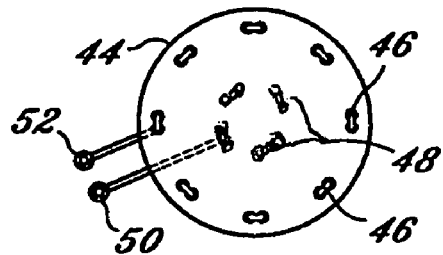
FIG. 10 is a top perspective view of another embodiment of the invention.
Figure 11:
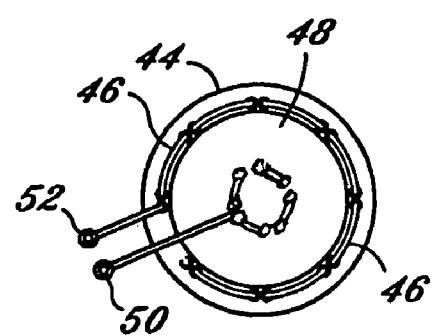
FIG. 11 is a bottom view of a portion of the embodiment shown in FIG. 10.
Figure 13:
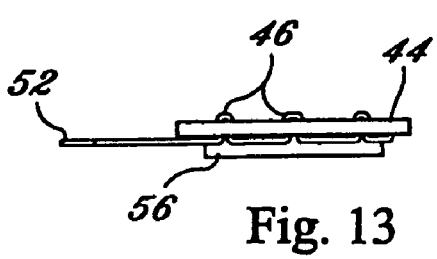
FIG. 13 is a side view of the embodiment of the invention shown in FIG. 10.

FIG. 10 is a top view; and the connections to the center conductor wire segments 48 are through the terminal 50. The outer conductor wire segments 46 are through the terminal 52, much in the same manner as described above in conjunction with the embodiment of FIGS. 6 through 9. FIG. 11 is a bottom view illustrating the manner in which the conductor wire segments 48 and 46 extend on the bottom of the device. The bottom is closed with suitable plastic in the same manner as described previously in conjunction with the embodiment of FIG. 7. Consequently only the conductor wire segments 46 and 48 (or conductor pins) on the top surface of the portion 44 are exposed for placement in proximity with the skin of an animal. FIG. 13 is a side view comparable to the view of FIG. 9, which illustrates the relative arrangement and threading of the outer conductor wire segments 46 around a circular extension or bottom 56 formed as a part of or attached to the portion 44 to illustrate the manner in which the segments of the conductor wires have formed on the surface of the portion 44.

The embodiment shown in FIGS. 10 through 13 also may be constructed in the alternative form described above in conjunction with the embodiment of FIGS. 6 through 9 by replacing the conductor segments 46 and 48 with pins having a rounded top extending just slightly beyond the upper surface of the housing 44. The manner of this construction in conjunction with the embodiment of FIGS. 10 to 13 is the same as the alternative discussed above in conjunction with the embodiment of FIGS. 6 thorough 9.

In the various embodiments which have been described above, various types of, materials may be used to construct the surface conductors. For example, copper, aluminum, stainless steel or plated brass or plated steel wires may be employed, all of which are electrically conductive and which can be used in each of the various embodiments. The wires may be made of solid, braided or woven material, which will function equally as well, and the choice of which is a design consideration for the particular application being made. Alternatively, conductive polymers may be employed for the various surface conductors. The surface conductors may be in the form of rounded metal pins, as described above in conjunction with an alternative embodiment for the one shown in FIGS. 6 through 9, or may be beaded, raised, stamped or extruded of the various materials described above for solid wire. The conductors also may be printed, etched or plated on the surface of rigid or flexible circuit boards. The reference to conductors throughout the specification is intended to include any conductive material and processes which may be employed to form surface conductors across which the voltage stimulation pulses may be applied.

It should be noted that the size and length of the surface conductors is not limited to any particular arrangement. This is readily apparent from the variety of embodiments which have been described above. It is apparent that the conductors may be arranged in parallel straight line, in a matrix, a square or rectangle, a circle, or positioned around a cone. The overall width and length of the grid pattern, however, has been found to be 2" or less for effectiveness. These different variations allow for consistent operation when the conductors are used to contact areas of the body of an animal other than the neck. The concept of employing surface conductors, as described in conjunction with the above embodiments, is best suited for stimulators which provide a high voltage, low current electrical output. With such devices, the animal senses a change in the perceived level of the output, irrespective of whether the external device's levels are changed using a manual adjustment, or are remotely controlled. Any number of commonly available plastics may be used to make the housings for the surface conductors, as well as any type of non-conductive material which is suitable for any particular application. The manner of attachment of the conductor housing to collars, harnesses, halters and the like also may utilize a wide variety of materials.

The foregoing description of the preferred embodiments of the invention is to be considered as illustrative and not as limiting. Various embodiments have been shown in order to illustrate the relatively wide variety of forms which may be taken by the invention. Various other changes and modifications will occur to those skilled in the art for performing substantially the same function, in substantially the same way, to achieve substantially the same result without departing from the true scope of the invention as defined in the appended claims.

What is claimed is:

1. A device comprising:

a housing for use as an animal training device designed to be worn on a strap close to the skin of an animal on the interior surface of the strap, the housing being electrically connected to a positive polarity output terminal of an electrical circuit and to a negative polarity output terminal of the electrical circuit, the housing comprising:

a nonconductive member with multiple spaced holes for exposed surface conductors; and multiple exposed surface conductors which are exposed through the spaced holes;

wherein the exposed surface conductors are interconnected such that one or more of the exposed surface conductors are connected to a positive polarity input terminal and separately, one or more of the exposed surface conductors are connected to a negative polarity input terminal such that the positive polarity input terminal and the negative polarity input terminal are electrically insulated from each other;

wherein the spaced holes and the exposed surface conductors are arranged to provide a distance of approximately ⅛ inch to approximately ¾ inch from any of the exposed surface conductors connected to the positive polarity input terminal, to the closest of the surface conductors connected to the negative polarity input terminal, such that many possible electrical paths are made between the one or more exposed surface conductors connected to the positive polarity input terminal, and the one or more exposed surface conductors connected to the negative polarity input terminal;

wherein the positive polarity input terminal has means for connecting to the positive polarity output terminal of the electrical circuit and the negative polarity input terminal has means for connecting to the negative polarity output terminal of the electrical circuit;

wherein the multiple exposed surface conductors are formed by two separate wires, the first of said wires having an end spaced from the non conductive member, forming either of said positive polarity input terminal or said negative polarity input terminal, the first wire extending from its terminal end toward said non conductive member and below said non conductive member, where said first wire extends alternately upwardly through and then downwardly through said spaced holes in said non conductive member a plurality of times to form the exposed surface conductors of said first wire, said second wire having an end forming either of the positive polarity input terminal or the negative polarity input terminal, the second wire extending from its terminal end towards said non conductive member and below said non conductive member to an outer peripheral portion proximate the outer edge of the non conductive member the second wire extending alternately upwardly through and then downwardly through said spaced holes in said non conductive member a plurality of times to form the exposed surface conductors of said second wire, and wherein the first and second wires are substantially covered by insulation except for the exposed surface conductors.

2. A device comprising:

a replacement housing for replacing electrodes on an animal training device designed to be worn on a strap close to the skin of an animal on the interior surface of the strap, the electrodes are connected to a positive polarity output terminal of an electrical circuit and to a negative polarity output terminal of the electrical circuit, the electrical circuit being connected to a battery, the replacement housing comprising:

a nonconductive structure with multiple spaced holes for exposed surface conductors; and multiple exposed surface conductors which are exposed through the spaced holes;

wherein the exposed surface conductors are interconnected such that one or more of the exposed surface conductors are connected to a positive polarity input terminal and separately, one or more of the exposed surface conductors are connected to a negative polarity input terminal such that the positive polarity input terminal and the negative polarity input terminal are electrically insulated from each other;

wherein the spaced holes and the exposed surface conductors are arranged with a distance of approximately ⅛ inch to approximately ¾ inch from any of the exposed surface conductors connected to the positive polarity input terminal, to the closest of the surface conductors connected to the negative polarity input terminal, such that many possible electrical paths are made between the one or more exposed surface conductors connected to the positive polarity input terminal, and the one or more exposed surface conductors connected to the negative polarity input terminal;

wherein the non conductive structure comprises an upper circular plate having a first diameter and multiple spaced holes and a lower circular plate having a second diameter, the first diameter being greater than the second diameter, and wherein the multiple exposed surface conductors are formed by two separate wires, the first of said wires having an end spaced from the circular plates, forming either of said positive polarity input terminal or said negative polarity input terminal, the first wire extending from its terminal end in a straight section extending from said terminal towards said plates and below said upper plate to a central portion of the upper plate, at the end of said straight section of said first wire said first wire forming a central circular portion at an interior portion of said upper plate, where said first wire extends alternately upwardly through and then downwardly through said spaced holes in said upper plate a plurality of times to form the exposed surface conductors at said central circular portion of said first wire, said second wire having an end spaced from the circular plates, forming either of the positive polarity input terminal or the negative polarity input terminal, the second wire extending from its terminal end in a straight section extending from said terminal towards said plates and below said upper plate to an outer peripheral portion proximate the outer edge of the upper plate, said straight section of said second wire being shorter than said straight section of said first wire, at the end of said straight section of said second wire said second wire forming an outer circular portion outwardly spaced from and concentric with said central circular portion of said first wire, where the second wire extends alternately upwardly through and then downwardly through said spaced holes in said upper plate a plurality of times to form the exposed surface conductors at said outer peripheral portion of said second wire.

3. A device according to claim 2 wherein the surface conductors are arranged in a pattern with the furthest distance between any of the surface conductors within the housing being approximately 2 inches or less.

4. A device according to claim 2 wherein the exposed surface conductors are conductor pins.

5. A device according to claim 2 wherein the exposed surface conductors are conductor wire segments.

6. A device comprising:
a housing for use as an animal training device designed to be worn on a strap close to the skin of an animal on the interior surface of the strap, the housing being electrically connected to a positive polarity output terminal of an electrical circuit and to a negative polarity output terminal of the electrical circuit, the electrical circuit being connected to a battery, the housing comprising:
a nonconductive structure with multiple spaced holes for exposed surface conductors; and multiple exposed surface conductors which are exposed through the spaced holes;

wherein the exposed surface conductors are interconnected such that one or more of the exposed surface conductors are connected to a positive polarity input terminal and separately, one or more of the exposed surface conductors are connected to a negative polarity input terminal such that the positive polarity input terminal and the negative polarity input terminal are electrically insulated from each other;

wherein the spaced holes and the exposed surface conductors are arranged with a distance of approximately ⅛ inch to approximately ¾ inch from any of the exposed surface conductors connected to the positive polarity input terminal, to the closest of the surface conductors connected to the negative polarity input terminal, such that many possible electrical paths are made between the one or more exposed surface conductors connected to the positive polarity input terminal, and the one or more exposed surface conductors connected to the negative polarity input terminal;

wherein the positive polarity input terminal has means for connecting to the positive polarity output terminal of the electrical circuit and the negative polarity input terminal has means for connecting to the negative polarity output terminal of the electrical circuit;

wherein the non conductive structure comprises an upper circular plate having a first diameter and multiple spaced holes and a lower circular plate having a second diameter, the first diameter being greater than the second diameter, and wherein the multiple exposed surface conductors are formed by two separate wires, the first of said wires having an end spaced from the circular plates, forming either of said positive polarity input terminal or said negative polarity input terminal, the first wire extending from its terminal end in a straight section extending from said terminal towards said plates and below said upper plate to a central portion of the upper plate, at the end of said straight section of said first wire said first wire forming a central circular portion at an interior portion of said upper plate, where said first wire extends alternately upwardly through and then downwardly through said spaced holes in said upper plate a plurality of times to form the exposed surface conductors at said central circular portion of said first wire, said second wire having an end spaced from the circular plates, forming either of the positive polarity input terminal or the negative polarity input terminal, the second wire extending from its terminal end in a straight section extending from said terminal towards said plates and below said upper plate to an outer peripheral portion proximate the outer edge of the upper plate, said straight section of said second wire being shorter than said straight section of said first wire, at the end of said straight section of said second wire said second wire forming an outer circular portion outwardly spaced from and concentric with said central circular portion of said first wire, where the second wire extends alternately upwardly through and then downwardly through said spaced holes in said upper plate a plurality of times to form the exposed surface conductors at said outer peripheral portion of said second wire.

* * * * *